United States Patent
Jeddeloh

(10) Patent No.: US 6,477,623 B2
(45) Date of Patent: *Nov. 5, 2002

(54) METHOD FOR PROVIDING GRAPHICS CONTROLLER EMBEDDED IN A CORE LOGIC UNIT

(75) Inventor: Joseph M. Jeddeloh, Minneapolis, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,207

(22) Filed: Oct. 23, 1998

(65) Prior Publication Data

US 2002/0027557 A1 Mar. 7, 2002

(51) Int. Cl.[7] .......................... G06F 15/16; G06F 12/00
(52) U.S. Cl. ...................... 711/147; 345/503; 345/519; 345/531
(58) Field of Search ............................ 711/2, 202, 203, 711/206, 207, 208, 209, 147; 345/501, 503, 519, 531

(56) References Cited

U.S. PATENT DOCUMENTS

| | | | |
|---|---|---|---|
| 5,905,509 A | 5/1999 | Jones et al. | 345/520 |
| 5,941,968 A * | 8/1999 | Mergard et al. | 710/128 |
| 6,108,014 A | 8/2000 | Dye | 345/507 |
| 6,148,357 A | 11/2000 | Gulick et al. | 710/128 |
| 6,151,651 A | 11/2000 | Hewitt et al. | 710/129 |
| 6,179,489 B1 | 1/2001 | So et al. | 395/672 |

OTHER PUBLICATIONS

Via Technologies, Inc. VT8501 Apollo MVP4 datasheet, rev. 1.3, 7/98, pp. 1–11, Jul. 1998.*
Accelerated Graphics Port Interface Specification. Rev. 1.0. Intel Corp. Jul. 31, 1996. pp. 1–8.*

* cited by examiner

Primary Examiner—Kevin Verbrugge
(74) Attorney, Agent, or Firm—Park, Vaughan & Fleming LLP

(57) ABSTRACT

The present invention provides a method for operating a core logic unit including an embedded graphics controller. This method facilitates high-bandwidth communications between the graphics controller and other computer system components, such as the processor and the system memory. Thus, one embodiment of the present invention provides a method for operating a core logic unit with an embedded graphics controller. This method includes receiving processor communications from a processor through a processor interface in the core logic unit, and transferring the processor communications through a switch to a graphics controller located in the core logic unit. It also includes receiving memory communications from a system memory through a memory interface in the core logic unit, and transferring the memory communications through the switch to the graphics controller. These processor communications and graphics communications are used to perform graphics computations in the graphics controller. Another embodiment of the present invention provides a method for translating memory addresses. This method includes receiving a first address as part of a memory operation directed to a system memory, and comparing the first address to a reserved range of addresses for storing graphics data. If the first address falls within the reserved range of addresses, the method translates the first address into a second address in the system memory, and uses the second address to perform the operation. If the first address does not fall within the reserved range of addresses, the method uses the first address to perform the operation.

10 Claims, 3 Drawing Sheets

METHOD FOR PROVIDING GRAPHICS CONTROLLER EMBEDDED IN A CORE LOGIC UNIT

RELATED APPLICATION

The subject matter of this application is related to the subject matter in a co-pending non-provisional application Ser. No. 09/177,739 by the same inventor(s) as the instant application and filed on the same day Oct. 23, 1998 as the instant application entitled, "Graphics Controller Embedded on a Core Logic Unit," now U.S. Pat. No. 6,346,946.

BACKGROUND

1. Field of the Invention

The present invention relates to special purpose circuitry for performing computer graphics computations. More specifically, the present invention relates to an architecture for a graphics controller embedded within a core logic unit of a computer system.

2. Related Art

The increasing power of computational circuitry has recently been applied to computer graphics applications, which manipulate graphical information for representing images on a computer system display. Computer graphics applications involve large volumes of data, which must be typically transformed through computationally-intensive numerical operations. In order to improve performance on these computer graphics applications, computer systems typically contain a dedicated piece of circuitry known as a "graphics controller" to perform computer graphics operations. This allows a computer system to off-load computationally-intensive graphics operations, such as 2-dimensional and 3-dimensional processing, from the central processing unit of the computer system onto the graphics controller. In spite of the improved performance provided by graphics controllers, the increasing computational requirements of computer graphics applications continue to push the capabilities of present computer system architectures.

This increasing demand for performance on computer graphics applications has been matched with corresponding performance increases in certain computer system components. (1) Graphics controllers are becoming increasingly more powerful as increasing integration densities allow faster and more sophisticated graphics processing circuitry to be incorporated onto a graphics controller chip. (2) Recent developments in memory system designs have greatly increased memory bandwidth. New memory architectures, such as Rambus and SyncLink, incorporate a synchronous clocked interface into each memory chip, thereby allowing data from within a page of memory to be clocked out of a memory chip in a continuous high-speed stream.

However, these increases in processing power and memory bandwidth have not been matched by a corresponding increase in a computer system's ability to move data between computer system components. For example, data transfers between processor and graphics controller, and between graphics controller and system memory are presently constrained by the bandwidth of the busses and/or data channels that couple these system components together.

To alleviate this problem, the Intel Corporation of Sunnyvale, Calif. has recently developed the Accelerated Graphics Port (AGP) architecture to handle communications between a graphics controller and the rest of the computer system. The AGP standard specifies a 32-bit, 133 MHz bus between the graphics controller and the computer system. An AGP bus can be used in a number of ways. For example, if texture map data for a graphics application cannot fit into a local frame buffer attached the graphics controller, the texture map data can instead be stored in system memory, where it can be accessed by the graphics controller through the AGP. Unfortunately, as the processing power of graphics controllers continues to increase, and as system memory bandwidth continues to increase, communication channels, such as AGP, are becoming a bottleneck to performance in computer graphics applications.

What is needed is a computer system architecture that facilitates high-bandwidth data transfers between a graphics controller and other computer systems components.

SUMMARY

The present invention provides a method for operating a core logic unit including an embedded graphics controller. This method facilitates high-bandwidth communications between the graphics controller and other computer system components, such as the processor and the system memory. Thus, one embodiment of the present invention provides a method for operating a core logic unit with an embedded graphics controller. This method includes receiving processor communications from a processor through a processor interface in the core logic unit, and transferring the processor communications through a switch to a graphics controller located in the core logic unit. It also includes receiving memory communications from a system memory through a memory interface in the core logic unit, and transferring the memory communications through the switch to the graphics controller. These processor communications and graphics communications are used to perform graphics computations in the graphics controller. Another embodiment of the present invention provides a method for translating memory addresses. This method includes receiving a first address as part of a memory operation directed to a system memory, and comparing the first address to a reserved range of addresses for storing graphics data. If the first address falls within the reserved range of addresses, the method translates the first address into a second address in the system memory, and uses the second address to perform the operation. If the first address does not fall within the reserved range of addresses, the method uses the first address to perform the operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Computer System

Figure 1:
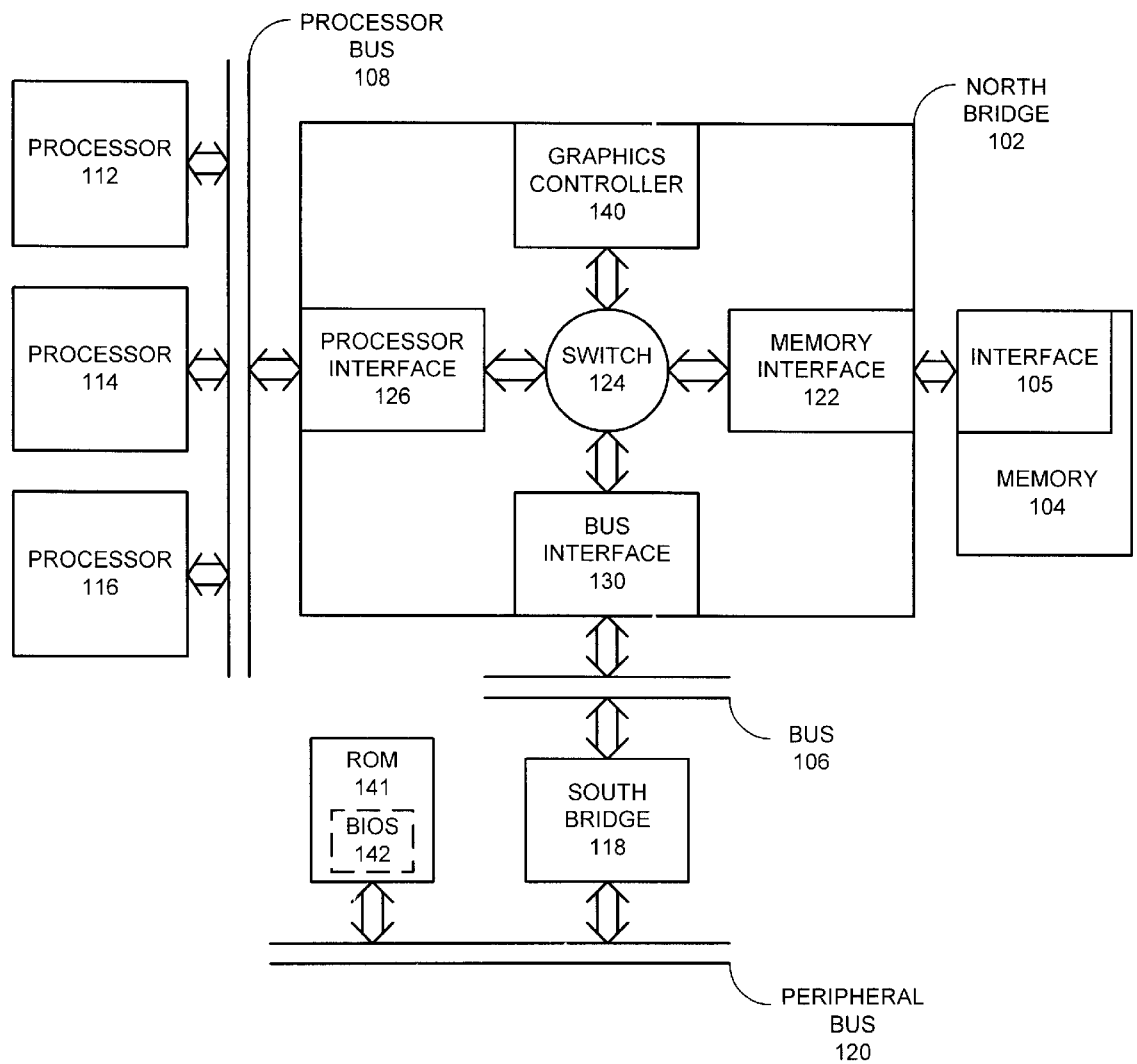
FIG. 1 illustrates a computer system including a core logic unit with an embedded graphics controller in accordance with an embodiment of the present invention.

FIG. 1 illustrates a computer system including a core logic unit with an embedded graphics controller in accordance with an embodiment of the present invention. The computer system illustrated in FIG. 1 includes processors 112, 114 and 116, which are coupled to processor bus 108. Processors 112, 114 and 116 may be any type of general or special purpose processors, including, but not limited to microprocessors, mainframe computers, digital signal processors, graphics processors and device controllers. Processor bus 108 may be any type of communication channel for coupling a processor to other devices in the computer system, including peripheral devices, memory devices and other processors.

North bridge 102 couples processor bus 108 with memory 104 and bus 106. As illustrated in FIG. 1, north bridge 102 contains: processor interface 126 for communicating with processor bus 108; memory interface 122 for communicating with memory 104; and bus interface 130 for communicating with bus 106. Interfaces 126, 128, 122 and 130 are coupled together through a switch 124, which can be any type of switching circuitry that is able to selectively couple together to interfaces 126, 128, 122 and 130.

Memory 104 may be any type of memory with a clocked interface that returns data along with a clock signal for latching the data during read operations. This may include memory implementing the SyncLink interface standard. In some embodiments, memory 104 includes a plurality of banks of memory, each of which includes a plurality of memory chips. As illustrated in FIG. 1, memory 104 includes interface 105, which interacts with memory interface 122 in north bridge 102 to send data to and receive data from north bridge 102.

Bus 106 couples north bridge 102 to south bridge 118. Bus 106 may include any type of communication channel for coupling north bridge 102 to other devices in a computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120.

Peripheral bus 120 may include any type of communication channel for coupling a south bridge 118 to other devices in a computer system, including peripheral devices and memory devices. In one embodiment of the present invention, peripheral bus 120 is an ISA bus.

Peripheral bus 120 is coupled to ROM 141, which contains BIOS 142. In one embodiment of the present invention, BIOS 142 includes code for aligning data clock and data signals received at memory interface 122 from memory 104.

North bridge 102 additionally includes graphics controller 140, which contains special-purpose circuitry for performing graphics computations. This allows graphics computations to be off-loaded from processors 112, 114 and 116. For example, in one embodiment of the present invention, graphics controller 140 includes circuitry to perform graphics computations for representing 2-dimensional and 3-dimensional objects. Note that graphics controller 140 is coupled directly to switch 124, and does not pass through any intervening interface or bus that can introduce bandwidth limitations.

The system illustrated in FIG. 1 operates generally as follows. When a processor, such as processor 112, needs to perform a computer graphics operation, the processor off-loads a portion of the computer graphics operation to graphics controller 140 by transferring data and/or code to perform the operation to graphics controller 140 through switch 124. Graphics controller 140 performs the operation using data from processor 112 and data from memory 104.

Description of Core Logic Unit

Figure 2:
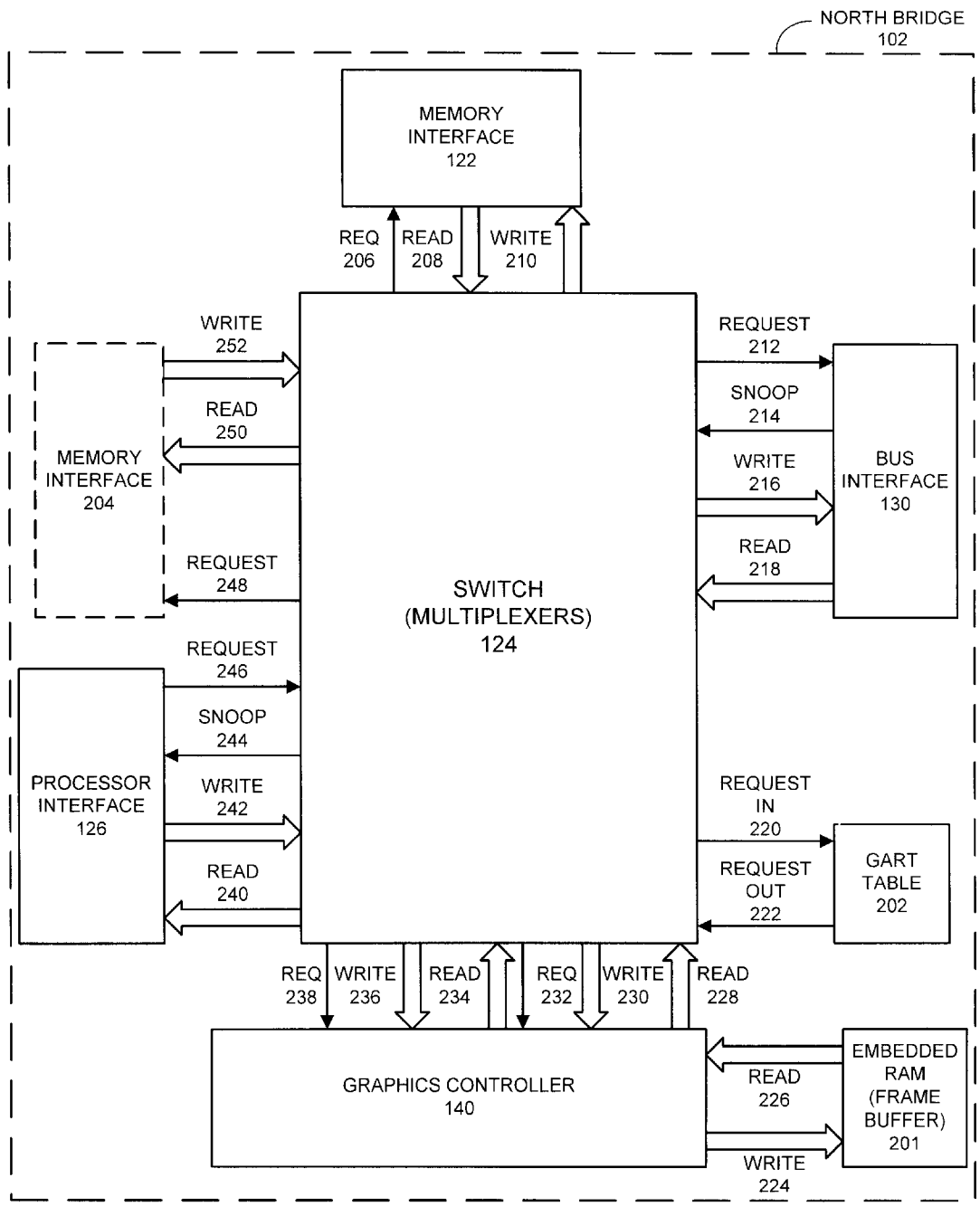
FIG. 2 illustrates the internal structure of a core logic unit including an embedded graphics controller in accordance with an embodiment of the present invention.

FIG. 2 illustrates the internal structure of a core logic unit including an embedded graphics controller in accordance with an embodiment of the present invention. In this embodiment, the core logic unit takes the form of north bridge 102, which couples together various portions of the computer system through an internal switch 124. More specifically, switch 124 couples together processor interface 126, memory interface 122, and bus interface 130. As mentioned above, processor interface 126 contains circuitry for communicating with processors attached to processor bus 108, memory interface 122 includes circuitry for communicating with memory 104, and bus interface 130 includes circuitry for communicating with devices attached to bus 106.

Switch 124 is additionally coupled to an optional second memory interface 204. Memory interface 204 provides a second pathway to system memory that facilitates concurrent transfers to system memory. For example, a processor coupled to processor interface 126 can communicate with a first bank of memory through memory interface 204, while graphics controller 140 communicates with a second bank of memory through memory interface 122.

Switch 124 is additionally coupled to graphics controller 140 and Graphics Address Relocation Table (GART table) 202, which together facilitate graphics computations within north bridge 102. As mentioned above, graphics controller 140 contains special-purpose circuitry for performing graphics operations, such as 2-dimensional and 3-dimensional graphics operations. Graphics controller 140 is additionally coupled to embedded RAM 201, which acts as a frame buffer for graphics controller 140. Locating embedded RAM 201 on the same semiconductor chip as graphics controller 140, instead of on a separate set of memory chips, changes the optimal implementation for embedded RAM 201. Connections between embedded RAM 201 and graphics controller 140 are not constrained by the pinout limitations of an externally located memory. Hence, it is possible to organize embedded RAM 201 for highly parallel retrieval of data. For example, embedded RAM can contain 4 megabits of data organized for retrieval in 1024 bit units. Note that the embodiment of embedded RAM 201 illustrated in FIG. 2 includes a separate read path 226 and a separate write path 224. Providing separate read and write paths facilitates concurrent read and write operations from embedded RAM 201. Additionally, these read and write paths can be quite wide, for example ranging from 128 to 512 bits.

In an alternative embodiment of the present invention, north bridge 102 does not include embedded RAM 201. Instead, the frame buffer is stored in a system memory attached to memory interface 122. At first glance it may appear that storing the frame buffer in system memory might degrade system performance by creating additional contention for system memory. However, recall that clocked memory devices presently provide more bandwidth than can be transferred over a processor bus, such as processor bus 108 from FIG. 1. Additionally, traffic between graphics controller 140 and system memory, and between processor and system memory tends to occur in bursts that do not necessarily coincide to create contention. Hence, the frame buffer traffic is unlikely to interfere with processor-to-memory traffic.

Switch 124 includes circuitry to couple together the various interfaces and computational circuits illustrated in FIG. 2. Switch 124 can assume a number of forms. In one embodiment, switch 124 takes the form of a cross-bar switch that can simultaneously couple together different subsets of the devices and interfaces coupled to switch 124. In other embodiments, switch 124 does not provide the general connectivity of a cross-bar switch, but instead provides a subset of the possible simultaneous connections.

In one embodiment of the present invention, switch 124 includes a plurality of multiplexers, wherein each multiplexer selects data to be outputted to a separate destination device or interface coupled to switch 124. For example, a multiplexer with outputs coupled to memory interface 122 might select between inputs from processor interface 126, graphics controller 140 and bus interface 130.

Switch 124 additionally includes arbitration logic to determine which data transfers are to be given priority over other transfers. For example, a request from processor interface 126 to memory interface 122 may be given priority over a request from graphics controller 140 to memory interface 122. In another example, the priority scheme might allow four data transfers from a given source to proceed before accepting data transfers from another source.

Switch 124 is coupled to interfaces and devices through different types of signal lines and data paths. More specifically, processor interface 126 is coupled to switch 124 through read path 240, write path 242, snoop signal 244 and request signal 246. By providing separate read and write paths, the system can transfer two data streams at the same time. For example, read path 240 can receive data from memory interface 122 while write path sends data to graphics controller 140. Snoop signal 244 is sent across switch 124 to maintain some form of consistency between multiple caches in the computer system that may potentially contain copies of the same data item. In some embodiments, snoop signal 244 may include a plurality of signal lines containing coherency information. Finally, request signal 246 contains information related to a data transfer request across switch 124. For example, request signal 246 may contain source and destination addresses for interfaces or devices attached to switch 124. Request signal 246 may additionally contain information specifying the type of request involved. For example, request signal 246 may specify whether the request is a read request or a write request.

Other interfaces and devices are coupled to switch 124 through corresponding signal paths and data lines. More specifically, memory interface 204 is coupled to switch 124 through write path 252, read path 250 and request signal 248. Similarly, memory interface 122 is coupled to switch 124 through write path 210, read path 208 and request signal 206. Bus interface 130 is coupled to switch 124 through write path 216, read path 218, snoop signal 214 and request signal 212.

In the illustrated embodiment, graphics controller 140 is coupled to switch 124 through two separate ports. A first port includes write path 236, read path 234 and request signal 238. A second port includes write path 230, read path 228 and request signal 232. By providing two ports, graphics controller can simultaneously send and receive data from two different locations on switch 124. For example, the first port can send and receive data from processor interface 126 while the second port sends and receives data from memory interface 122.

Note that because the data paths connecting graphics controller 140 and other devices to switch 124 do not cross chip boundaries, they are not constrained by the pinout limitations of semiconductor chips. Hence, these data paths can be considerably wider than busses that typically couple computer system components together. These wide data paths can be useful in transferring the high-bandwidth data received from clocked interfaces on SyncLink or Rambus memory devices. For example, in one embodiment of the present invention, write path 236, read path 234, write path 230 and read path 228 are each 128 bits wide. The other read and write paths coupled to switch 124 can be similarly widened to take advantage of the increased connectivity available within a core logic unit such as north bridge 102. In other embodiments, data paths can be 16, 32, 64, 128, 256, 512 and even 1024 bits wide.

Graphics Address Relocation Table (GART table) 202 is used to translate addresses from a reserved range of graphics addresses into addresses containing graphics data that are scattered throughout system memory. Addresses from a contiguous reserved range of graphics addresses can be mapped to non-contiguous portions of the system memory. This allows system memory to be dynamically mapped and allocated for use by graphics controller 140.

GART table 202 includes copies of the most recently used page translations between the reserved range of graphics addresses and corresponding locations in the system memory. In fact, GART table 202 can be viewed as a Translation Lookaside Buffer (TLB) for addresses in the reserved range of graphics addresses. Translations that have not been used recently may not exist in GART table 202, and may have to be retrieved from a comprehensive table of graphics address translations contained in the system memory. This corresponds to a TLB pulling in an entry from a page table during a TLB fault.

The implementation of GART table 202 in the present invention differs from conventional implementations of GART tables in a number of ways. First, GART table 202 translates destination addresses originating from a number of different interfaces and devices coupled to switch 124. In doing so, the present invention tests each destination address to see if it falls within the reserved range of addresses, and if so, performs the address translation. This differs from conventional systems in which GART tables are used to translate only destination addresses originating from an off-chip graphics controller. This added flexibility allows other devices, such as a processor attached to processor interface 126 or a Direct Memory Access (DMA) device attached to bus interface 130, to directly access graphics data stored in system memory.

Second, GART table 202 performs address translation on-the-fly as a data transfer traverses switch 124. If an address does not fall within the reserved range of address, the data transfer is allowed to proceed. On the other hand, if the address falls within the reserved range of addresses, the data transfer is delayed (perhaps by a clock cycle) so that the address translation can take place. Next, the data transfer is allowed to proceed using the translated address. This differs from conventional systems that place a GART table lookup in the path of all addresses.

Description of Processor Translating Graphics Addresses

Figure 3:
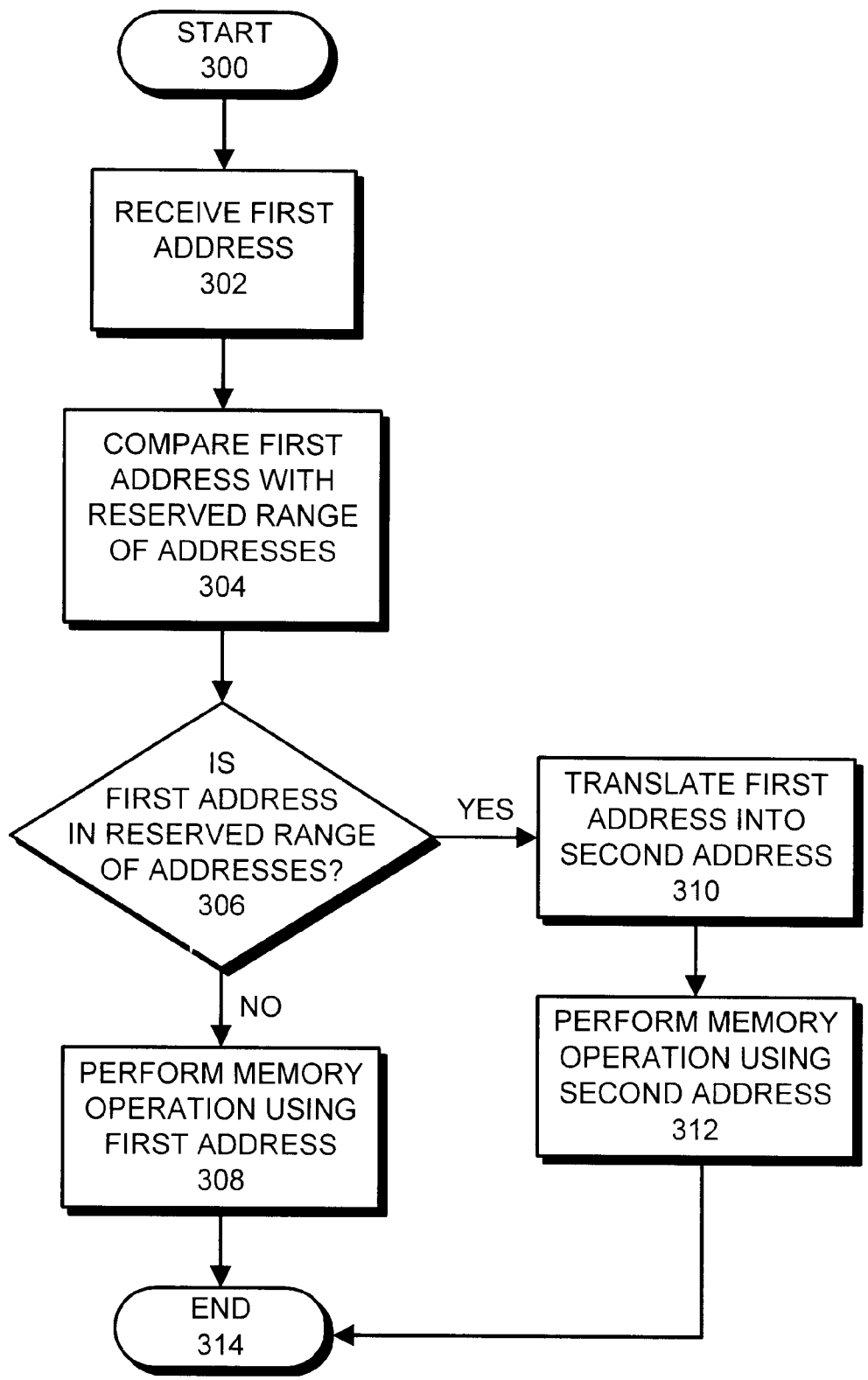
FIG. 3 is a flow chart illustrating the process of performing graphics address translations for graphics data stored in system memory on-the-fly in accordance with an embodiment of the present invention.

FIG. 3 is a flow chart illustrating the process of performing graphics address translations for graphics data stored in system memory on-the-fly in accordance with an embodiment of the present invention. The process works as follows. The system receives a first address that is part of a data transfer across switch 124 (state 302). This first address is compared against bounds registers for a reserved range of graphics addresses to determine if the first address falls within the reserved range (state 304). Note that the data transfer is allowed to proceed while this comparison takes place, and is only interrupted if the first address falls within the reserved range. If the first address does not fall within the reserved range, the system performs the data transfer operation using the first address (state 308). Otherwise, the system translates the first address into a second address within the system memory using a translation contained in GART table 202 (state 310). If the translation is not present in GART table 202, the system may have to retrieve the translation from a comprehensive translation table stored in the system memory. Next, the system performs the data transfer operation using the second address (state 312). This may involve delaying the operations and providing additional clocks cycles for the memory operation to complete.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for performing graphics computations on a core logic unit, comprising:
    receiving processor communications from a processor through a processor interface in the core logic unit;
    transferring the processor communications through a switch to a first channel on a graphics controller located within the same semiconductor chip as the core logic unit;
    receiving memory communications from a system memory through a memory interface in the core logic unit;
    transferring the memory communications through the switch to a second channel on the graphics controller; and
    performing graphics computations involving the processor communications and the memory communications in the graphics controller; whereby the graphics controller can simultaneously receive processor communications on the first channel and receive memory communications on the second channel.

2. The method of claim 1, further comprising communicating with a local memory located on the same semiconductor chip as the graphics controller, for storing graphics data.

3. The method of claim 2, wherein communicating with the local memory includes communicating with a frame buffer, for storing a frame of graphical data to be outputted to the computer system display.

4. The method of claim 1, wherein transferring the processor communications through the switch includes transferring the processor communications through at least one multiplexer.

5. The method of claim 1, wherein transferring the memory communications through the switch includes translating addresses using a Graphics Address Relocation Table (GART) coupled to the switch, which translates addresses from a reserved range of graphics addresses into addresses in the system memory.

6. The method of claim 5, wherein translating the addresses through the Graphics Address Relocation Table (GART) includes translating the addresses on-the-fly as the addresses from the reserved range of graphics addresses pass through the switch.

7. The method of claim 5, wherein translating the addresses through the Graphics Address Relocation Table (GART) includes performing address translations for addresses that fall within the reserved range of addresses, and not performing translations for other addresses.

8. The method of claim 1, wherein transferring the processor communications through the switch to the graphics controller includes transferring the processor communications through a read path and a write path between the switch and the graphics controller, wherein the read path is separate from the write path.

9. The method of claim 1, wherein:
    transferring the processor communications through the switch to the graphics controller includes transferring the processor communications through a processor port between the graphics controller and the switch; and
    transferring the memory communications through the switch to the graphics controller includes transferring the memory communications through a memory port between the graphics controller and the switch.

10. The method of claim 1, wherein receiving memory communications from the system memory includes:
    receiving a first address as part of an operation directed to the system memory;
    comparing the first address to a reserved range of addresses for storing graphics data;
    if the first address falls within the reserved range of addresses,
        translating the first address into a second address in the system memory, and
        using the second address to perform the operation; and
    if the first address does not fall within the reserved range of addresses, using the first address to perform the operation.

* * * * *